United States Patent [19]
Brake et al.

[11] 3,847,738
[45] *Nov. 12, 1974

[54] BLOOD COLLECTION AND PRESERVATION UNIT

[75] Inventors: Jon M. Brake, Burbank; Fred H. Deindoerfer, Northridge, both of Calif.

[73] Assignee: American Hospital Supply Corporation, Evanston, Ill.

[ * ] Notice: The portion of the term of this patent subsequent to Nov. 12, 1991, has been disclaimed.

[22] Filed: Nov. 1, 1971

[21] Appl. No.: 194,652

[52] U.S. Cl. .............................................. 195/1.8
[51] Int. Cl. .......................................... A61k 27/00
[58] Field of Search .................................... 195/1.8

[56] References Cited
OTHER PUBLICATIONS

Chemical Abstracts, Vol. 67, entry 80422k, 1967.
Strickland et al., Biochimica et Biophysica Acta, Vol. 159, No. 2, pages 221–226, 1968.

Primary Examiner—Richard L. Huff

[57] ABSTRACT

Blood collection and preservation units comprising containers with anticoagulant solutions therein are improved by incorporating dihydroxyacetone (DHA) in the anti-coagulant solutions, either alone or in combination with one or more other additives, such as adenine, inosine, and sodium pyruvate. The quality of fresh blood stored in the improved units is significantly better, and the quality can be maintained for longer storage times.

4 Claims, No Drawings

BLOOD COLLECTION AND PRESERVATION UNIT

BACKGROUND AND SUMMARY

Certain standard blood collection and preservation units are specified in the U.S. Pharmacopeia. The containers, which may be glass or plastic, and the infusion assemblies for filling the containers are respectively specified in U.S. Pharmacopeia XVIII, pages 887 and 923. The single-dose containers, are of colorless transparent, Type I or Type II glass, or of a suitable plastic material, complying with the U.S.P. requirements. The internal volume of the containers is usually sufficient to collect one-half liter (500 ml.) of blood for admixture with an anticoagulant solution therein of 70–125 ml. The containers therefore have an internal volume of more than 500 ml., additional volume being provided for the anticoagulant solution. The present invention is not concerned with these features per se, but rather with the chemical additives employed in the anticoagulant solutions.

The U.S.P. contains two approved anticoagulant solutions. These are Anticoagulant Citrate Dextrose solution (ACD) and Anticoagulant Citrate Phosphate Dextrose solution (CPD), respectively described in the U.S. Pharmacopeia XVIII, at pages 47 and 48–49. ACD is a sterile solution of citric acid, sodium citrate, and dextrose in injectable water. The citric acid and sodium citrate provide citrate ions to prevent coagulation of the blood, and the dextrose serves as the principal energy source for the red cells. In the approved ACD formulations, the amount of dextrose provided is 1.84 g. for each 500 ml. of whole blood. The dextrose in the formula is on the basis of dextrose monohydrate, but the dextrose can be added in anhydrous form, using 1.68 g. anhydrous dextrose for each 500 ml. blood.

The CPD anticoagulant solution is a sterile solution of citric acid, sodium citrate, sodium biphosphate, and dextrose in water for injection. The citric acid and sodium citrate provide citrate ions to prevent coagulation. The dextrose is monohydrate and incorporated in an amount corresponding to 1.79g. per 500 ml. of blood, or 1.63 g. if added as anhydrous dextrose.

As specified in the U.S. Pharmacopeia, ACD prepared as "Solution A" is used in the amount of 75 ml. per 500 ml. of whole blood, while when prepared as "Solution B", 125 ml. are used per 500 ml. of blood. CPD as specified is used in the amount of 70 ml. per each 500 ml. of whole blood.

In utilizing aqueous anticoagulant sugar solutions (viz. ACD and CPD) for admixture with freshly collected blood, the standard practice is to store the blood-anticoagulant mixtures under refrigeration, but without freezing (viz. storage at 1°–6°C.). Although the red cells remain viable under such storage conditions up to 21 days with 70 percent or more of the red cells surviving 24 hours administration, it is well recognized that the quality of the blood progressively deteriorates. The administration of fresh blood to patients is more desirable, or the administration of blood not stored for more than one week. During the second and third week of storage, the preference is to administer the blood in limited quantities. At the end of 21 days, the standard blood bank practice in the United States is to discard the blood or process it for plasma proteins.

Frozen blood stored at very low temperatures (below −85° C.) does not undergo significant deterioration during relatively long storage times of up to several years. However, because of the added expense in freezing blood and storing it in a frozen condition, the use of frozen blood has not become a commercial blood storage practice. Rather, the search has been for chemical additives to be incorporated in the anti-coagulant solution, which are capable of improving the quality of blood and extending the permissible storage time.

It is known that red cells contain 2,3-diphosphoglycerate (2,3-DPG), and that this compound is an important regulator of the oxygen affinity of hemoglobin. Where the 2,3-DPG level of red cells is too low, the hemoglobin will tend to hold the oxygen, which interferes with the release of oxygen to the body tissues. It is unfortunate, therefore, that under the standard blood bank storage, the level of 2,3-DPG of the red cells deteriorates rapidly. On administration of the blood, the 2,3-DPG content of the red cells is gradually restored to normal levels, but 24 hours or longer may be required. In the meantime, the administered blood can be ineffective for oxygen transport, and may actually lower the oxygen transport efficiency of the entire circulatory system, depending upon the amount and age of the blood administered. Additives for blood storage units capable of increasing, or at least retarding the drop, in red cell 2,3-DPG have therefore been the subject of active investigation.

An interrelated problem is that of maintaining ATP levels in stored blood, the decline in the quality of stored blood having been found to be due to the deterioration of ATP content of the red cells as well as the 2,3-DPG content thereof. It is known that the addition of adenine helps to maintain ATP levels in stored blood, but, unfortunately, the addition of adenine can contribute to deterioration in 2,3-DPG levels. This effect has been found to be offset to some extent by also adding inosine, which compound also appears to have some value in rejuvenating blood with subnormal 2,3-DPG levels. Pyruvate has also been found to improve ATP levels at alkaline pH, or in combination with inosine to maintain or increase DPG levels. It has also been shown that alkaline pH (7 to 9) favors increased DPG levels.

In accordance with the present invention, dihydroxyacetone (DHA) is incorporated in the anticoagulant solution primarily for the purpose of increasing and/or maintaining the 2,3-DPG content of the freshly collected blood. The presence of millimolar quantities of DHA in stored blood prevents the rapid deterioration of 2,3-DPG content, and tends to maintain the red cells at near normal 2,3-DPG levels for a much longer period of time under refrigerator storage conditions. The DHA is non-toxic and is safe to administer in the quantities required for this purpose. It is likely that the DHA enters the red cells where it is converted to a normal metabolite, or series of metabolites, including dihydroxyacetone phosphate, D-glyceraldehyde-3-phosphate, 1,3-diphosphoglycerate, 2,3-DPG, or 3-phosphoglycerate.

It is believed that the invention is adaptable for use with all presently known anticoagulant formulations, including known experimental formulations as well as those especially approved for general use. Further the invention extends to combinations of quality-maintaining or restoring agents. Specifically, DHA can be utilized in combination with adenine, or pyruvate, or inosine, or combinations thereof. Desirable combinations of additives include DHA, with adenine and pyruvate, or DHA with inosine and pyruvate, or DHA with adenine, inosine and pyruvate. With these combinations, the quality of the blood can be improved with respect to both ATP and 2,3-DPG levels during 1 to 21 days of storage, or the storage time can be increased by 1 to 3 weeks, giving total storage times up to 28 to 42 days at 1°–6°C.

DETAILED DESCRIPTION

In practicing the present invention, approved types of blood collection and preservation containers are preferred. Either glass or plastic containers can be utilized, providing they meet the U.S.P. requirements. (See U.S. Pharmacopeia XVIII, pages 887 and 923.) The containers will be sized for receiving and storing a predetermined volume of blood, such as 1,000 ml., 500 ml., etc. Typically, the containers will have an internal volume adapted for receiving 500 ml. (½ l.) of blood together with 70 to 125 ml. of anticoagulant solution. In other words, the containers can have an internal volume of around 570 to 625 ml. The containers will also be equipped with means for introducing the fresh blood as it is collected, and for delivery of the blood in transfusion. Such transfusion and infusion assemblies used with the blood collection and storage units should meet U.S.P. requirements. (See U.S. Pharmacopeia XVIII, p. 887).

As in the established practice, the anticoagulant solution within the containers will contain an anticoagulant substance to prevent coagulation of the blood, and a sugar energy source for the red cells. The preferred anticoagulant is "citrate ions" which may be supplied by sodium citrate, or mixture of citric acid and sodium citrate. The quantities to be employed can be the same as in present practice (see U.S. Pharmacopeia XVIII, pages 47–49).

The sugar energy source for the red cells is preferably dextrose. However, it is known that other sugars are equivalent to dextrose for this purpose, including fructose, mannose, and galactose. The amount of dextrose or equivalent sugar employed can be the same as in present practice (see U.S. Pharmacopeia XVIII, pages 47–48). More specifically, from about 1.7 to 1.9 grams dextrose based on dextrose monohydrate can be utilized per 500 mililiters of blood. However, the DHA, if employed in sufficient concentration, can be utilized as a supplemental, or even alternative, energy source for the red cells. The improved units of the present invention therefore include embodiments where the dextrose or equivalent sugar content is reduced to substantially below established levels, as will be explained more fully below.

In practicing the present invention, the blood collection and preservation unit should contain at least 5 and preferably at least 10, millimoles (mM) DHA per liter of blood. Consequently, when the unit is designed to collect 500 ml. of blood, at least 2.5 and preferably 5 mM of DHA will be incorporated in the aqueous anticoagulant solution. While there does not appear to be any critical upper limit on the content of DHA, there appears to be no reason to exceed 100 mM DHA per liter of blood. When the container is designed for 500 ml. of blood, therefore, it will not be necessary to incorporate more than 50 mM of DHA in the anticoagulant solution. Where the DHA is being utilized for 2,3-DPG maintenance, and a sugar energy source is provided, as in present practice, it will usually not be necessary to employ more than 30 mM of DHA per liter of blood, or 15 mM per 500 ml. of blood.

As indicated previously, however, the content of dextrose or equivalent sugar in the anticoagulant solution can be reduced. For example, where the amount of sugar is restricted to an amount equivalent to less than 2.0 grams of dextrose monohydrate per liter of blood, it is desirable to incorporate from 20 to 100 mM of DHA per liter of blood. In a preferred embodiment, the blood collection and preservation unit is designed to receive and store substantially 0.5 liters of fresh blood. It will therefore contain from 10 to 50 mM of DHA, and less dextrose (or equivalent sugar) than the amount corresponding to 1.0 grams dextrose monohydrate. The sugar energy source can be eliminated entirely.

As indicated previously, DHA can be utilized in combination with inosine, pyruvate, and adenine, either with each of these ingredients separately, or in multiple additive combinations, such as DHA with inosine and pyruvate, or DHA with adenine and pyruvate. The quantities of these substances which can be utilized is summarized below in Table A.

Table A

| | Ranges of Additives | |
|---|---|---|
| Substance | g/l of Anticoagulant Solution (75 ml/0.5 l. blood) | mM/l. Blood |
| Dihydroxyacetone | 3.45 – 69 | 5 – 100 |
| Inosine | 10.3 – 61.8 | 5 – 30 |
| Sodium pyruvate | 0.09 – 18.0 | 0.1 – 20 |
| Adenine | 0.11 – 1.10 | 0.1 – 1.0 |

In the foregoing table reference is made to sodium pyruvate. While this is the preferred form for addition of pyruvate ions, other forms can be utilized, such as pyruvic acid, etc.

The pH of the anticoagulant solutions, as in present practice, can approximate pH 5 for ACD and pH 5.6 for CPD. However, the improvements of the present invention can be utilized in conjunction with a broader pH range, such as anticoagulant pH's within the range from 5 to 9, and including pH's above 7.0.

The effect of DHA in maintaining 2,3-DPG levels of red cells is illustrated by the data of Table B as set out below. The U.S.P. anticoagulant CPD was modified by adding 555 mg. of adenine per liter, and 12.9 grams per liter of DHA. By using 70 ml. of this solution to each 500 ml. of blood, the concentration of DHA in the blood was equal to 20 mM per liter, or 10 mM per 500 ml. of blood.

Table B

| | 2,3-Diphosphoglycerate (% of initial value) | |
|---|---|---|
| Time (weeks) | without DHA | with DHA |
| 0 | 100 | 100 |
| 1 | 100 | 101 |
| 2 | 103 | 133 |
| 3 | 65 | 114 |
| 4 | 34 | 95 |
| 5 | 21 | 72 |

The determination of 2,3-DPG levels for the comparisons of Table B was made by an analytical procedure adapted from the method described by J. S. Loos and H. K. Prins, "Application of a mechanized method for the determination of different glycolytic intermediates in the routine quality control of red cells, " in "Red Cell Matabolism and Function," ed. G. J. Brewer, Plenum Press, New York, 1970, ppg. 277–288. This method utilizes the catalytic effect of DPG on the enzymatic conversion of 3-phosphoglycerate to 2-phosphoglycerate. By adding other enzymes, the 2-phosphoglycerate is converted to lactate, with concomitant oxidation of nicotinamide adenine dinucleotide, reduced from (NADH). The latter compound fluoresces, so the rate of the reaction can be followed by a fluorometer. The blood sample is diluted 1:12000 with 0.001 M ammonia before analysis. A Technicon auto-analyzer was used to perform the analyses automatically.

It will be understood that the interior of the blood collection and preservation units, including the anticoagulant solutions, should be sterile. Heat sterilization can be used, as in present practice, the prepared units with the anti-coagulant solutions therein being subjected to autoclaving. DHA is stable to heat sterilization at pH 4, but some degradation can occur at 5 or above. Any loss of DHA in heat sterilization can be compensated for. Alternatively, other methods of sterilization can be utilized, such as sterile filtration.

The improved blood collection and preservation units coming within the scope of this invention are further illustrated by the following specific examples.

Example I

Dissolve the following chemicals in 800 ml. of water for injection U.S.P. and add water to make one liter of solution: citric acid (anhydrous) 7.3 g., sodium citrate dihydrate 22.0 g., dextrose monohydrate 24.5 g., dihydroxyacetone 12.0 g. Filter the solution through an 0.8 micron pore size filter. Place the solution in a blood bag or bottle, in a ratio of 75 ml. of solution for 500 ml. of blood to be collected. Sterilize by autoclaving at 240° F. for 20 minutes.

EXAMPLE II

Dissolve the following chemicals in 800 ml. of water for injection U.S.P. and add water to make one liter of solution: citric acid (anhydrous) 3.0 g., sodium citrate dihydrate 26.3 g., sodium biphosphate monohydrate 2.22 g., dextrose monohydrate 25.5 g., dihydroxyacetone 12.9 g. Filter the solution through an 0.8 micron pore size filter. Place the solution in a blood bag or bottle, in an amount of 70 ml. of solution for 500 ml. of blood to be collected. Sterilize by autoclaving at 240° F. for 20 minutes.

EXAMPLE III

Dissolve the following chemicals in 800 ml. of water for injection U.S.P. and add water to make one liter of solution: sodium citrate dihydrate 31.0 g., sodium biphosphate monohydrate 0.041 g., dibasic sodium phosphate heptahydrate 0.344 g., dextrose monohydrate 25.5 g., dihydroxyacetone 12.9 g. Sterilize by filtering through a 0.22 micron pore size filter. Using aseptic technique, place the solution in a sterile blood bag or bottle, in a ratio of 70 ml. of solution for 500 ml. of blood to be collected.

EXAMPLE IV

Follow the procedures of Examples I, II, and/or III, adding adenine in the amount of 51.8 mg. to the aqueous solution.

EXAMPLE V

Follow the procedure of Examples I, II, III and/or IV, adding inosine in the amount of 20.6 g. to the aqueous solution.

EXAMPLE VI

Follow the procedure of Examples I, II, III, IV, and/or V, adding sodium pyruvate in the amount of 9.0 g. to the aqueous solution.

EXAMPLE VII

Follow the procedure of Examples I, II, III, IV, and/or V, omitting the dextrose and adding an additional 22.1 g. of dihydroxyacetone to the solution.

EXAMPLE VIII

In Examples III, IV, V, VI, and VII, wherever sterile filtration is specified, dissolve all the chemicals except dextrose and DHA in 700 ml. of water and bring to 800 ml. final volume (Solution A). Dissolve the dextrose and DHA in 200 ml. of water final volume (Solution B), since DHA can give a browning reaction like dextrose. Filter the two solutions through an 0.8 micron pore size filter and place them in separate blood bags or bottles. The bags or bottles may be connected by pharmaceutical grade plastic tubing and clamped to facilitate aseptic mixing after autoclaving. Sterilize them by autoclaving at 240° F. for 20 minutes. Aseptically mix the two solutions before drawing blood. Mix 60 ml. of Solution A and 15 ml. of Solution B for drawing 500 ml. of blood.

EXAMPLE IX

Follow the procedure of Examples I, II, III, IV, V, VI, VII, and/or VIII, but omit the citric acid and sodium citrate. Add heparin 2,115 U.S.P. units.

EXAMPLE X

Utilizing similar levels of addition and procedures, as described above, DHA can be incorporated in other anti-coagulant formulations reported in the literature. These include the following:

1. ACD (or CPD) - Adenine

Using ACD or CPD with adenine can extend storage time to 35–42 days based on erythrocyte survival in vivo, but DPG levels are slightly decreased compared to ACD (CPD). Usual adenine level to be added is 0.5 mM per liter of blood. Ref: C. E. Shields, "Comparison Studies of Whole Blood Stored in ACD and CPD and with Adenine," Transfusion, Vol. 8, pp. 1–8, 1968.

2. ACD (or CPD), pH 6 to 8, with or without Adenine

Using a storage pH above 6, or preferably above 7 (alkaline pH 7–9) favors DPG maintenance. ATP level drops during first week or two storage. Ref: E. Beutler, A. Meul, and L. A. Wood, "The Depletion and Regeneration of 2,3-Diphosphoglyceric Acid in Stored Red Blood Cells," Transfusion, Vol. 9, page 109, 1969. Adenine can also be added as described above.

3. ACD (or CPD) — Adenine-Pyruvate pH 7-7.5

Pyruvate addition helps prevent a drop in ATP. Usual pyruvate level is 0.1 mM per liter of blood. Maintains DPG for three weeks. Ref: E. Beutler, "The Effect of Storage Conditions on 2,3-DPG Levels." paper presented at 23rd Annual Meeting, American Association of Blood Banks, San Francisco, Oct. 29, 1970.

4. Bicarbonate-Phosphate-Dextrose-Adenine, Alkaline pH(7–9)

DPG can be maintained 5 or 6 weeks by replacing the plasma with an "artificial medium" having following constituents in mM per liter of medium: sodium bicarbonate, 130; phosphate, 10; dextrose, 55; adenine, 1. Ref: L. Wood and E. Beutler, "Storage of Erythrocytes in Artificial Media, " Transfusion, Vol. 11, pp. 123–133, 1971.

5. ACD (or CPD) — Adenine-Inosine

Inosine maintains DPG levels for about 4 weeks. Usual concentration of inosine is 10–15 mM per liter of blood. Ref: H. F. Bunn, M. H. May, W. F. Kocholaty, and C. E. Shields, The Journal of Clinical Investigation, Vol. 48, pp. 311–321, 1969. Alternatively, inosine at a lower level can also be added to the blood after 2–3 weeks storage. Adenine can be added at the beginning of storage.

6. ACD (or CPD) — Adenine-Inosine-Pyruvate

Inosine and pyruvate together cooperate to maintain DPG levels for about 5 weeks. Concentrations of inosine and pyruvate are 10–20 mM per liter of each. Regeneration experiments where old blood is incubated at 37°, show the synergistic effect of pyruvate-inosine as described by F. A. Oski, S. F. Travis, L. D. Miller, M. Delivovia-popadopoulus and E. Cannon in Blood, Volume 37, pp. 52–58, 1971.

We claim:

1. A blood collection and storage unit, including container means having a storage volume for receiving and storing a corresponding volume of blood, and aqueous preservative solution means admixable with blood stored in said container means, wherein the improvement comprises having present in said preservative solution means for admixture with the stored blood an amount of dihydroxyacetone (DHA) equal to 5 to 100 millimoles (mM) of DHA per liter of said container storage volume.

2. The improved blood collection and storage unit of claim 1 wherein said DHA is present in an amount of from 10 to 30 mM of DHA per liter of said container storage volume.

3. A blood collection and storage unit, including a container having a storage volume for receiving and storing 0.5 liters of blood, and an aqueous sterile preservative solution admixable with the blood stored in said container, wherein the improvement comprises having present in said preservative solution for admixture with the stored blood from 2.5 to 50 millimoles (mM) of dihydroxyacetone (DHA).

4. The improved blood collection and storage unit of claim 3 wherein said DHA present in an amount of from 5 to 15 mM.

* * * * *